June 16, 1959
P. H. CASKEY ET AL
2,891,007
METHOD OF REGENERATING ION EXCHANGERS
Filed Nov. 16, 1955
2 Sheets-Sheet 2
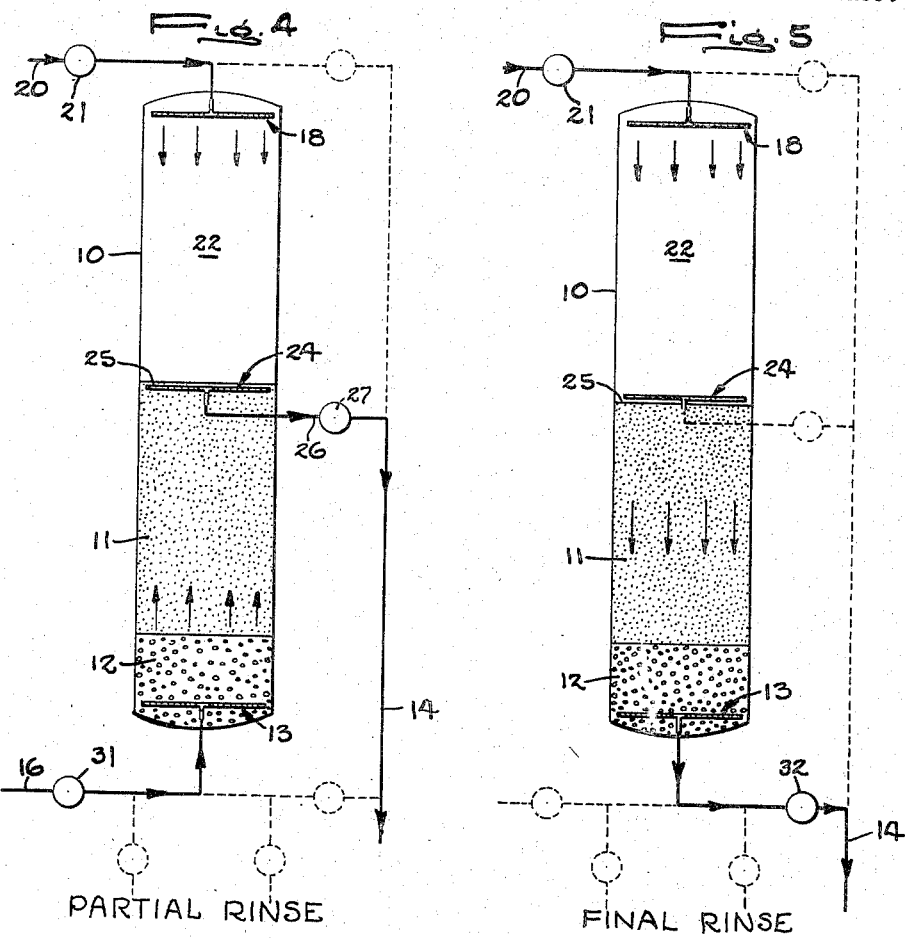
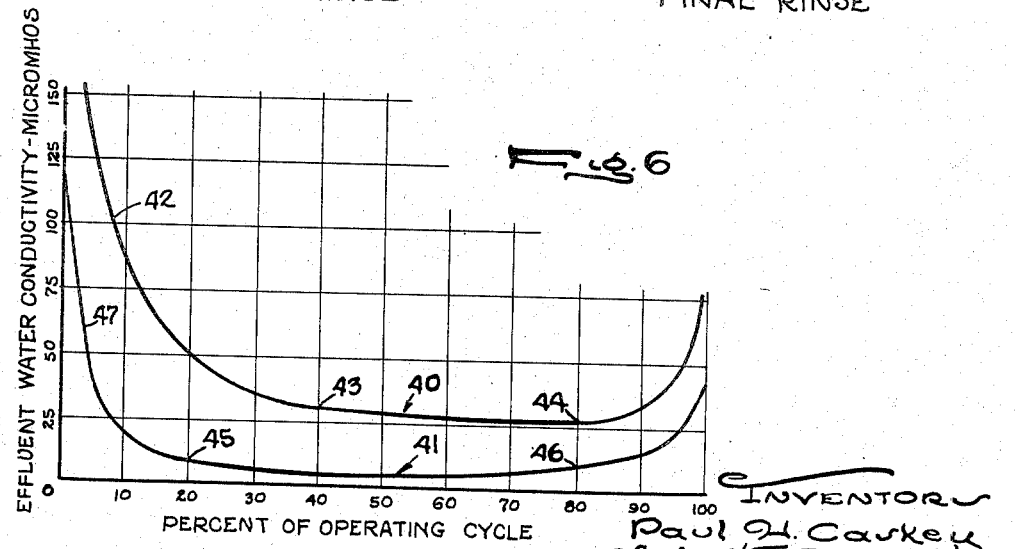

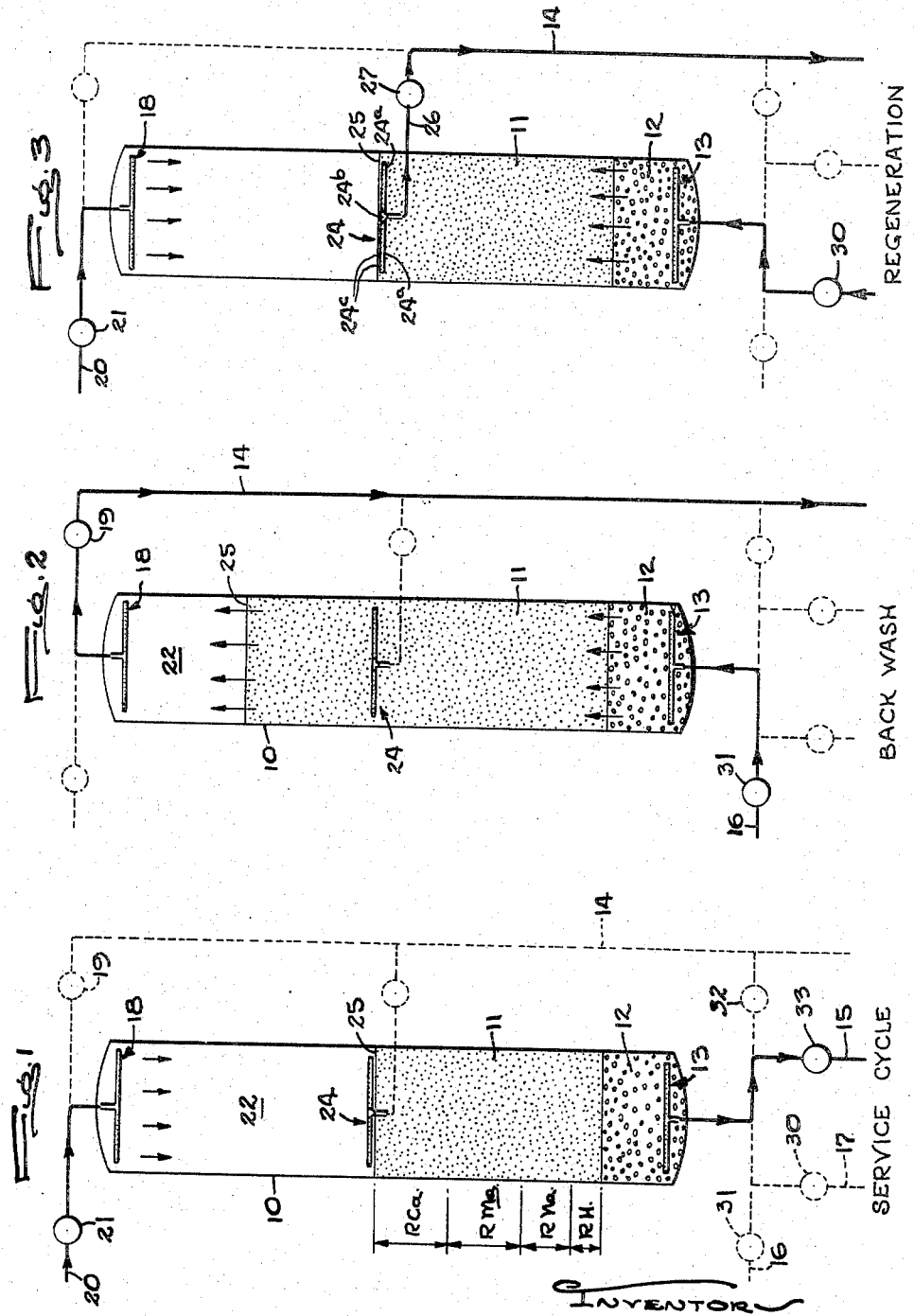

United States Patent Office 2,891,007
Patented June 16, 1959

2,891,007

METHOD OF REGENERATING ION EXCHANGERS

Paul H. Caskey and August C. Reents, Rockford, Ill., assignors to Illinois Water Treatment Co., Rockford, Ill., a corporation of Illinois Application November 16, 1955, Serial No. 547,283

8 Claims. (Cl. 210—35)

In the service cycle of a two bed ion exchanger for deionizing water, the water is first passed downwardly through a column of cation exchange resin having replaceable hydrogen ions and then through a column of anion exchange resin having exchangeable hydroxyl ions. After exhaustion each column is regenerated by passing the regenerant solutions, acid for the cation resin and caustic for the anion resin, downwardly through the respective columns, the excess of each regenerant being rinsed out by passing water downwardly through the resin beds.

Such down flowing of the regenerants and rinse waters is the accepted practice and is necessitated by the lightness of modern high capacity resins as contrasted with the denser green sand or zeolites used in early cation exchangers in which upflow regeneration was permissible. Therefore, by regenerating and rinsing downflow, expansion of the bed into the freeboard space and the difficulties that accompany this are avoided. High regeneration efficiency is thus achieved but at a substantial sacrifice as will appear later in the purity of the deionized water and also in the production capacity of the cation and anion resin beds, particularly in the treatment of certain waters containing abnormal amounts of sodium salts.

The primary object of the present invention is to overcome the disadvantages inherent in conventional regeneration practice and provide a novel method by which the regenerating solution may be flowed upwardly through the column of ion exchange resin while at the same time preventing loosening or expansion of the inherently light weight resin.

Another object is to hold the resin column in a compacted condition during regeneration by maintaining the freeboard space above the column filled with a liquid during the upflowing of the regenerant solution.

Still another object is to block the expansion of the resin bed through the use of a column of water flowing downwardly in opposition to the upwardly advancing regenerant solution.

Other objects and advantages of the invention will become apparent from the following detailed description taken in connection with the accompanying drawings, in which Figure 1 is a diagrammatic longitudinal sectional view of an ion exchanger and associated connections adapted for use in practicing the improved process.

Figs. 2 and 3 are similar views illustrating the liquid flows during backwashing and regeneration.

Figs. 4 and 5 are similar views showing the steps preferably followed in rinsing the regenerated resin.

Fig. 6 is a chart comparing the performance of the improved method with the method commonly used in regenerating cation exchangers.

While the improved method may be used to advantage in the regeneration of the anion exchanger, its greatest utility is achieved in the operation of the cation exchanger of a two bed system for deionizing water containing an abnormally large proportion of sodium salts. Accordingly, the invention will be illustrated and described in connection with such use but it is to be understood that we do not intend to limit the invention by such disclosure but aim to cover all modifications and alternative uses falling within the spirit and scope of the invention as expressed in the appended claims.

In the service cycle of a two bed ion exchanger for deionizing water, the cation and anion exchangers are connected in series and the raw water is passed downflow first through the cation exchanger as shown in Fig. 1 and then down through the resin column of the anion exchanger (not shown). The calcium, magnesium and sodium cations removed in the cation exchanger become distributed at different levels in the resin column as indicated in Fig. 1. Owing to the different valences and molecular weights of the different ions, the calcium ions are concentrated in the uppermost part of the column and are attached to the smallest particles of the resin which settle there as an incident to the hydraulic classification which occurs in the backwashing step of the previous regeneration cycle. The magnesium ions are found in the intermediate portion of the bed while most of the sodium ions are retained in the lower part of the bed.

Preparatory to regeneration, the column is first backwashed by upflowing water therethrough causing the resin to expand into the freeboard space at the upper end of the treating tank, the resin particles rising to different levels according to their size. The former pattern of distribution of the calcium, magnesium, and sodium ions at different levels is thus restored as the resin particles settle down following interruption of the backwash flow.

Now, if the cation exchanger is regenerated in accordance with conventional practice, acid, usually sulphuric acid, is passed downwardly through the resin column in the same direction as the water in the service cycle, the hydrogen of the acid replacing the calcium and magnesium ions and most of the sodium ions. Best economy is achieved by limiting the amount of acid used and not attempting to effect complete regeneration of all of the resin. As a result, a substantial part of the monovalent sodium ions are not replaced and remain in the resin in the lower part of the column. The amount of the sodium thus retained of course corresponds to the proportion of sodium salts in the water being treated.

In the subsequent service use of the exchanger by flowing raw water downwardly through the regenerated bed, calcium and magnesium ions are exchanged for hydrogen in the upper part of the column, the hydrogen combining with the anions to produce hydrochloric and sulphuric acid. When this acid reaches the lower part of the column, it reacts with the retained sodium ions the same as in the regenerating reaction, thus forming sodium chlorides or sulphates which are carried on with the effluent into the anion exchanger. In the latter, the sodium salts are converted to sodium hydroxide which appears in and contaminates the final effluent or deionized water.

This roundabout action due to the retention of sodium ions in the cation resin after regeneration and the ensuing leakage of these ions from the cation exchanger precludes the production of deionized water of the desired high purity by the operation of the two bed method on raw water containing a substantial amount of sodium salts.

Through the use of the present invention, the leakage of sodium ions through a cation exchanger may be reduced substantially by reversing the direction of flow of the acid solution through the cation resin bed to first bring the acid into contact with the lower part of the column where the sodium ions are concentrated thus insuring more complete removal of these ions. At the same time any metallic cations which remain due to inefficiency of the regeneration are located in the uppermost past of the column in which position there is little possibility of their escaping with the stream of treated water as it flows downwardly through the column.

The improved method may be practiced in the ion exchanger shown in Fig. 1 and comprising a vertically elongated tank 10 confining a column of granular ion exchange resin 11 which, in the case of the cation exchanger, is preferably of the styrene-divinylbenzene sulfonic type. Among the presently available resins of this type are those sold under the trade names of Amberlite IR-120 and Nalcite HCR. The resin column is supported in the usual way on a screen or bed 12 of graded quartz or anthracite disposed above a bottom distributor 13 through which liquid may be drained through a pipe 14 or the treated water may flow to a pipe 15 leading to the top of the anion exchanger for further ion exchange treatment. Similarly, backwash or rinse water or the acid regenerant may be introduced into the tank bottom through pipes 16 and 17. Backwash water may overflow from the top of the tank through a distributor 18 which may be connected to the drain line through a valve 19. Water to be treated is introduced through the same distributor from a pipe 20 and a valve 21.

The resin bed 11 occupies a little more than half of the tank length between the screen 12 and the distributor 18 so as to leave a so-called freeboard space 22 into which the resin may expand as illustrated in Fig. 2 while being backwashed by water forced under pressure into the tank through the lower distributor 13.

The improved method involves the use of a third or intermediate distributor 24 disposed in the lower part of the freeboard space 22 and at or adjacent the upper end 25 of the resin bed 11 where the spent regenerating solution may be withdrawn from the tank as soon as it passed through the resin column. Preferably this distributor comprises a plurality of arms 24ª radiating from a central head 24ᵇ and each having suitably screened outlet holes 24ᶜ therein disposed in a horizontal plane which is disposed at or close to the upper end 25 of the resin column after the latter has settled down in the tank. The head of the distributor communicates with the inner end of a pipe 26 extending horizontally and outwardly through the tank wall and having a valve 27 therein.

The manner of using the apparatus above described in practicing the improved process is illustrated in Figs. 2 to 5. During the service cycle, raw water is flowed downwardly through the resin column as illustrated in Fig. 1, the effluent passing out through a valve 33 and the pipe 15. After the exchanger has become exhausted, the resin column is backwashed (Fig. 2) by flowing water into the bottom of the tank and upwardly through the bed at a rate sufficient to expand the bed well above the intermediate distributor 24 and into the freeboard space 22. The resin particles thus loosened separate and classify themselves automatically in the upflowing stream. Then, when the flow is interrupted, after about fifteen minutes, the tank remains full of water and the granules settle down to the level of the intermediate distributor, the former arrangement of the granules according to their sizes being restored. That is to say, the smaller particles which were the first to be exhausted in the previous service cycle return to the upper part of the column while larger particles settle into the lower portion of the tank, the exchanged monovalent cations (sodium) and any hydrogen ions not used in the service cycle being attached to these larger particles.

With the cation resin thus submerged in water and prepared for regeneration, the valve 27 is opened connecting the intermediate distributor 24 to the drain line 14 and the required dosage of dilute sulphuric acid is introduced into the tank through the lower distributor 13, the rate of flow being suitably established as by adjusting a valve 30 in the acid supply line 17. According to accepted practice, this rate is a range of from 1 to 3 gallons per minute per square foot of the bed area. Preferably, the first third of the acid is a one percent solution while the concentration of the remaining two-thirds is four percent. The upwardly flowing stream of acid first displaces the water submerging the resin and forces the water out of the tank through the intermediate distributor 24 into the drain line 14. The acid then follows upwardly along this same path, the spent acid passing out of the tank through the intermediate distributor.

Because of the location of the distributor 24 close to the upper end of the column, upward movement of the regenerating solution is confined to that portion of the tank between the distributors 13 and 24 thereby preventing any appreciable expansion of the bed and loosening of the resin particles. As a consequence of this, the resin particles remain compacted together, this condition being conducive to most efficient use of the acid dosage.

During upflowing of the acid through the bed, the freeboard space 22 is of course filled with a fluid which, by closing the valve 19 at the end of the backwashing, may be a body of water that remains in a stagnant condition as the excess acid flows out through the distributor 24. To provide a more positive force resisting expansion of the resin bed, it is preferred to direct a definite flow of water downwardly through the freeboard space while the acid is flowing upwardly through the resin. This may be accomplished by opening the valve 21 during the regeneration step to cause a flow of water into the tank through the upper distributor 18. The rate of this flow is adjusted so as to prevent any substantial expansion of the bed. For a tank sixteen inches in diameter containing 5.2 cubic feet of Nalcite HCR resin, it has been found that virtually no expansion of the bed takes place when the water is flowed downwardly at a rate of 2.9 g.p.m./sq. ft. with the acid regenerant flowing upwardly at 2.2 g.p.m./sq. ft.

The flow of water downwardly in opposition to the upflowing acid stream as indicated by the arrows in Fig. 3 effectually reduces the tendency of the latter to expand the resin bed. As the water meets the acid stream at the upper end of the resin bed, the two combine and flow out through the distributor 24 whose effective area is sufficiently large to accommodate such flow.

After all of the acid dosage has passed into the tank, the valve 30 is closed and the valve 31 is opened to initiate rinsing of the resin following the flow pattern indicated by the arrows in Fig. 4, the rates of up and downflow being the same as during the regeneration step. As before, the resin bed remains in compacted condition below the intermediate distributor 24 where the two streams meet and then escape to the drain. Such upflow rinsing is continued until most of the acid and all of the products of regeneration are removed from the bed. This is indicated by a drop in the methyl orange acidity of the effluent from the intermediate distributor 24 to about 1000 parts per million. Then, the upflow of the rinse water through the tank is discontinued by closing the valves 31 and 27.

For the final rinsing of the resin to remove the last trace of the acid, a different flow pattern is employed in order to avoid the absorption in the lower part of the bed of any of the sodium ions contained in the rinse water. For this purpose, the direction of the flow is reversed so that the water passes downwardly the same as in the service cycle. This is accomplished simply by opening the drain valve 32. At the same time, the rate of downflow of the rinse water is preferably increased, for example, to about 6 g.p.m./sq. ft. and continued until no trace of the regenerant acid remains in the outgoing rinse water.

By conducting the rinsing in two steps, all of the products of the regenerating reaction including calcium, magnesium, and sodium sulphates are removed effectually from the resin bed without leaving in the lower part of the bed enough sodium ions to give rise to the sodium leakage difficulty described above.

Repeated tests of the improved process following the procedure described above resulted in a substantial reduction in the leakage of sodium ions as compared to conventional downflow regeneration. In the water treated, the total dissolved minerals was 340 parts per million calcium carbonate equivalents and the percentage of cations was 35.2 calcium, 14.1 magnesium, and 50.7 sodium. The tests were performed in a tank 104 inches long and 1.5 inches inside diameter using .068 of a cubic foot of Nalcite HCR cation exchange resin. The procedure including the particular flow rates described above was followed closely. After regeneration raw water was passed at the rate of 6 g.p.m./sq. ft. through the cation exchanger connected in series with an anion exchanger having the property of removing all of the anions remaining in the cation exchanger effluent. The conductance of the resulting deionized water was measured periodically until exhaustion as determined by a rise in the conductance of the deionized water to about 40 micromhos per cubic centimeter.

To make the comparison, repeated tests were made using the same resins, flow rates, rinse and raw water, and regenerants except that in regenerating the cation resin the acid and the rinse water were passed downflow through the bed 11 to conform to conventional regeneration practice.

The results of the comparative tests are plotted in Fig. 6, the curve 40 showing the changes in the quality or conductance of the deionized water at different times in the operating cycle of the two bed cation-anion exchange apparatus when following conventional downflow regeneration procedure. The conductance of the water decreased slowly as indicated at 42 and did not reach 50 micromhos until after one-fifth of the total cycle. The lowest conductance produced was 26 and this extended over only 40 percent of the cycle between the points 43 and 44.

With the improved process, water of substantially lower conductance, 5 micromhos per cc., was produced as shown by the curve 41, and this quality was maintained over about 60 percent of the cycle between the points 45 and 46. Moreover, high quality of water was obtained much earlier in the cycle as indicated at 47 on the curve 41. The substantial difference in the quality of deionized water as shown by the spacing of the curves is attributable to the greater leakage of sodium ions through the cation exchanger as explained above when following the conventional downflow regeneration procedure.

The high capacity is attributable to the most efficient use of the regenerant and of the rinse water resulting from the maintenance of the resin column in a compacted condition during regeneration and rinsing thus avoiding any possibility of expansion of the bed which has precluded the use of upflow regeneration as practiced heretofore with the heavier zeolite materials. The improved procedure permits the use of a minimum amount of water in rinsing the regenerant out of the bed thereby avoiding excessive loss of avaiable exchange capacity of the resin after it has been regenerated.

This is particularly advantageous in the case of the anion exchanger because of the inherently lower density of anion resins which are now available as compared to available cation exchange resins.

It will be apparent that the advantages enumerated above are achieved by a very simple modification in the flow pattern of the regenerant solution and rinse water as compared to conventional practice in the use of present day ion exchange resins. The number of steps in the regenerating cycle remains the same and no alteration of any consequence is required in the construction of the apparatus.

We claim as our invention:

1. In the operation of an ion exchange system having a column of ion exchange resin confined below a freeboard space and in the lower portion of a tank having upper and lower distributors at the top and bottom of the tank and an intermediate distributor at the lower end of said freeboard space, the method of regenerating said column after a downflow service cycle which includes the steps of backwashing said resin by flowing water upwardly throughout the full length of said tank to expand said bed into said freeboard space, interrupting the backwash flow to leave said tank filled with water and allow the resin to settle below said intermediate distributor, introducing a solution for regenerating said resin into said tank through said lower distributor, simultaneously flowing water into said tank through said upper distributor and down through said freeboard space, withdrawing the combined streams of the water and the spent regenerating solution from the tank through said intermediate distributor whereby to prevent substantial expansion of said resin into said freeboard space, rinsing the major portion of the regenerating solution out of the tank by flowing water upwardly through the bed while continuing the flow of water down through said freeboard space and out through said intermediate distributor, and rinsing out the last traces of the regenerating solution by flowing water downwardly through the full length of the regenerated column.

2. In the operation of an ion exchanger having a column of ion exchange resin confined below a freeboard space and in the lower portion of a tank having upper and lower distributors at the top and bottom of the tank and an intermediate distributor at the lower end of said freeboard space, the method of regenerating said resin after exhaustion by a stream of water flowed downwardly through the column which includes the steps of backwashing said resin by flowing water upwardly throughout the full length of said tank to expand said bed into said freeboard space, interrupting the backwash flow to leave said tank filled with water and allow the resin to settle, thereafter introducing regenerating solution for said resin into said tank through said lower distributor, withdrawing the spent regenerating solution from the tank through said intermediate distributor while said freeboard space remains filled with water whereby to prevent substantial expansion of the resin into said freeboard space, rinsing out the major portion of the excess of said solution by flowing water upwardly through the bed and out of the tank through said intermediate distributor, and rinsing out the remainder of the solution by flowing water downwardly through the regenerated column.

3. In the operation of an ion exchanger having a column of ion exchange resin confined below a freeboard space and in the lower portion of a tank having upper and lower distributors at the top and bottom of the tank and an intermediate distributor at the lower end of said freeboard space, the method of regenerating said resin after exhaustion by a downflowing stream of water which includes the steps of backwashing said resin by flowing water upwardly throughout the full length of said tank to expand said bed into said freeboard space, interrupting the backwash flow to leave said tank filled with water and allow the resin to settle in the tank, thereafter introducing regenerating solution for said resin into said tank through said lower distributor, simultaneously flowing water into said tank through said upper distributor and down through said freeboard space, and withdrawing the combined streams of the water and the spent regenerating solution from the tank through said intermediate distributor whereby to prevent substantial expansion of said resin into said freeboard space by the upflowing solution.

4. In the operation of an ion exchanger having a column of ion exchange resin confined below a freeboard space and in the lower portion of a tank having upper and lower distributors at the top and bottom of the tank and an intermediate distributor at the lower end of said freeboard space, the method of regenerating said resin after exhaustion by a downflowing stream of water which includes the steps of backwashing said resin by flowing water upwardly throughout the full length of said tank to expand said bed into said freeboard space as the water overflows through said upper distributor, interrupting the backwash flow to leave said tank filled with water and allow the resin to settle down to the plane of said intermediate distributor, thereafter introducing regenerating solution for said resin into said tank through said lower distributor to cause the solution to flow upwardly toward said intermediate distributor, and during such upward flow, simultaneously withdrawing the spent regenerating solution from the tank through said intermediate distributor.

5. In the operation of an ion exchanger having a column of ion exchange resin confined below a freeboard space and in the lower portion of a tank having upper and lower distributors at the top and bottom of the tank and an intermediate screened distributor at the lower end of said freeboard space, the method of regenerating said resin after exhaustion by a downflowing stream of water which includes the steps of backwashing said resin by flowing water upwardly throughout the full length of said tank to expand said bed into said freeboard space as the water overflows through said upper distributor, terminating said backwashing and allowing said resin to settle down to said intermediate distributor, introducing regenerating solution for said resin into said tank through said lower distributor to cause a flow thereof upwardly through said bed, and simultaneously withdrawing the spent regenerating solution from said intermediate distributor to prevent the solution and said resin from rising above the intermediate distributor.

6. In the operation of an ion exchange system having cation and anion exchangers exhausted by downflowing a stream of water therethrough and each having a column of resin confined below the freeboard space in a tank, the method of regenerating the resin in the cation exchange tank to reduce the leakage of sodium ions through the system including the steps of backwashing said resin by flowing water upwardly throughout the full length of said tank to expand said column into the freeboard space, interrupting the backwash flow to allow said resin to settle while leaving said tank filled with water, introducing acid regenerating solution into said tank below the lower end of said column, simultaneously flowing water into the tank at the upper end thereof and down through said freeboard space, withdrawing the combined streams of water and said solution from the tank in a plane disposed substantially at the upper end of said column whereby to prevent substantial expansion of said resin into said freeboard space, rinsing the major portion of the acid solution out of the tank by flowing water upwardly through the column while continuing the flow of water down through said freeboard space and out of the tank along said plane, and rinsing out the remainder of the acid solution by flowing water downwardly through the full length of the regenerated column.

7. In the operation of an ion exchange system having cation and anion exchangers exhausted by downflowing a stream of water therethrough and each having a column of resin confined below the freeboard space in a tank, the method of regenerating the resin in the cation exchange tank to reduce the leakage of sodium ions through the system including the steps of backwashing said cation resin by flowing water upwardly throughout the full length of said tank to expand said column into said freeboard space, interrupting the backwash flow to leave said tank filled with water and allow said resin to settle, introducing acid regenerating solution into said tank below the lower end of said column, simultaneously flowing water into said tank at the upper end thereof and down through said freeboard space, and withdrawing the combined streams of the water and the solution from the tank as they meet in the plane of the upper end of said column whereby to prevent substantial expansion of said resin into said freeboard space by the upflowing solution.

8. In the operation of an ion exchange system having cation and anion exchangers exhausted by flowing a stream of water downwardly therethrough and each having a column of resin confined below the freeboard space in a tank, the method of regenerating the resin in the cation exchange tank to reduce the leakage of sodium ions through the system including the steps of backwashing said resin by flowing water upwardly throughout the full length of said tank to expand said column into said freeboard space, terminating said backwashing and allowing said resin to settle, introducing acid regenerating solution into said tank below the lower end of said column to cause a flow thereof upwardly through the column, and simultaneously withdrawing the excess of said solution from the tank in the plane of the upper end of said resin column whereby to prevent endwise expansion of the column into said freeboard space by the upflowing solution.

References Cited in the file of this patent

UNITED STATES PATENTS

| | | |
|---|---|---|
| 1,942,808 | Dotterweich | Jan. 9, 1934 |
| 2,101,961 | Slidell | Dec. 14, 1937 |
| 2,268,607 | McGill | Jan. 6, 1942 |
| 2,666,741 | McMullen | Jan. 19, 1954 |

FOREIGN PATENTS

| | | |
|---|---|---|
| 224,656 | Great Britain | Nov. 20, 1924 |
| 228,259 | Great Britain | 1925 |
| 638,956 | Great Britain | June 21, 1950 |